Feb. 13, 1962 M. HOROVITZ 3,020,738
TORQUE TRANSMISSION COUPLINGS
Filed March 14, 1960 2 Sheets-Sheet 1

Inventor
Marcus Horovitz
By Kemon, Palmer & Stewart

Feb. 13, 1962 M. HOROVITZ 3,020,738
TORQUE TRANSMISSION COUPLINGS
Filed March 14, 1960 2 Sheets-Sheet 2

3,020,738
TORQUE TRANSMISSION COUPLINGS
Marcus Horovitz, Leicester, England, assignor to Metalastik Limited, Leicester, England, a British company
Filed Mar. 14, 1960, Ser. No. 14,676
Claims priority, application Great Britain Mar. 17, 1959
9 Claims. (Cl. 64—19)

This invention relates to flexible torque transmission couplings, and concerns couplings which give a variable stiffness in torsion as the torque increases.

In accordance with United States Patent No. 2,791,893 it is already known to provide such a coupling, the coupling comprising two or more rockers for connection to the driving element and arranged in circumferential alternation with a like number of similar rockers for connection to the driven element, each rocker being hinged to the rocker on either side of it by torsionally-resistant resilient elements whereby an articulated ring of rockers is formed.

According to the present invention, each rocker is connected to the rocker on either side of it by links, the rockers being hinged to the links by torsionally-resistant resilient elements whereby an articulated ring of rockers and links is formed.

Thus, stated another way, the present invention provides a torque transmission coupling comprising two or more rockers for connection to the driving element and arranged in circumferential alternation with a like number of similar rockers for connection to the driven element, each rocker being connected to the rocker on either side of it by links which are hinged to the rockers by torsionallyl-resistant resilient elements.

The torsionally-resistant resilient elements are preferably of rubber or the like material, and may be in the form of a rubber or like bushes, each bush having an external peripheral engagement with one of the parts (i.e. a link or a rocker arm) to be hinged, and an internal peripheral engagement with the other of the parts to be hinged. Each bush may be bonded at its inner and outer peripheries to the metal with which it is in engagement, and the bushes may be radially compressed. Each bush may have inner and outer metal sleeves forming a bush unit with the rubber. Preferably however, the rubber bushes are inserted either directly in the links or the rockers.

As with the couplings of Patent No. 2,791,893 each rocker may be provided with a torsionally-resistant resilient element by means of which it may be connected with its respective driving or driven element. These torsionally-resistant resilient elements are also preferably of rubber or the like material and in the form of a bush of rubber or the like. Preferably also these bushes are bonded or otherwise attached directly in the rocker arms, although they may have inner and outer metal sleeves.

The links in couplings according to the present invention would normally be outside the pitch circle on which the rocking axes of the rockers are arranged when the coupling is in use.

By providing links connecting the adjacent rockers instead of directly hinging the rockers together it is possible to provide a coupling having a smaller overall diameter whilst selecting the angle between the arms of each rocker so as to give a minimum of radial deflection of the hinge axes to adjust for the variations in the geometry of the coupling in use due to variation in the torsional deflection due to the torque transmitted. This is important in making certain that no excessive radial load is applied to the bushes at the ends of the rocker arms, and the fact that this feature may be designed for using link connections with a coupling of smaller overall diameter gives a considerable advantage where space restrictions dominate.

A specific embodiment of the present invention will now be described, merely by way of example, with reference to the accompanying drawings of which:

Figure 1:
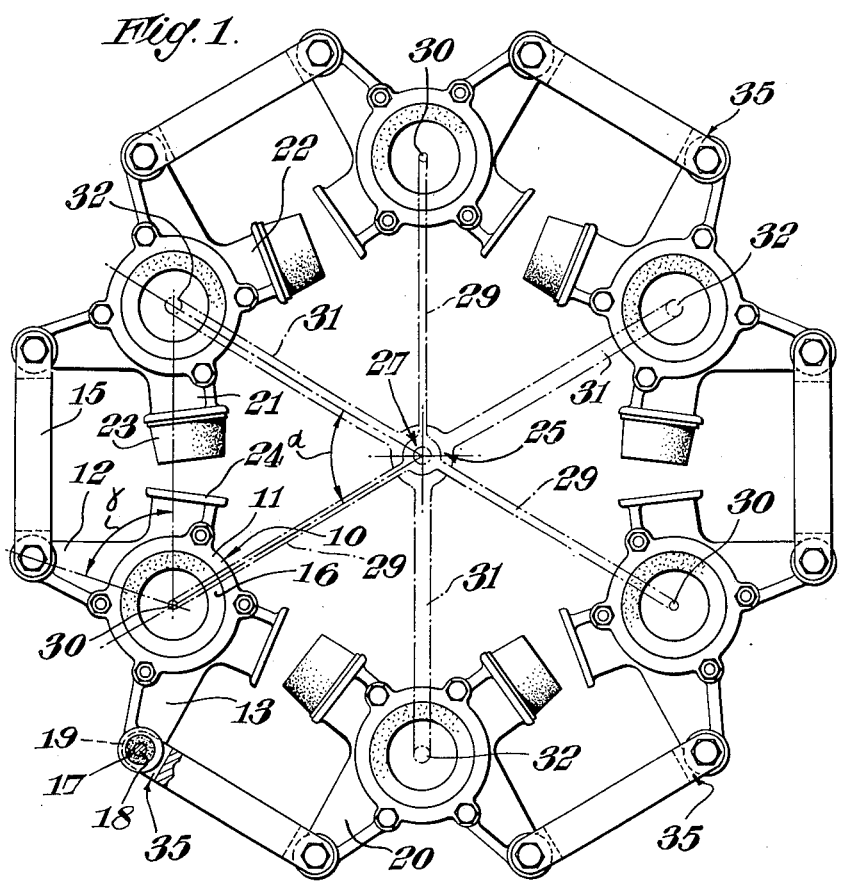
FIG. 1 is an end view of a six rocker coupling according to the invention.
Figure 2:
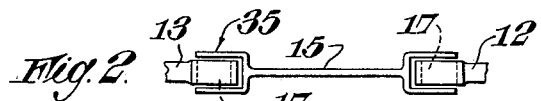
FIG. 2 is a diagrammatic side view of a link of FIG. 1.

Referring to FIG. 1 of the drawings, each rocker 10 has a central hub portion 11 having rocker arms 12 and 13.

The six rockers are identical and are assembled in a common plane around a pitch circle, on which the axes of the hub portions are centered, with the arms 12, 13 projecting outwardly. Adjacent arms 12 and 13 of adjacent rockers are connected together by links 15 which are hinged to the arms so as to form a unitary system of articulated links and rockers extending in a ring.

The coupling is intended for connection between a three armed spider 25 or its equivalent on a driving element and a three armed spider 27 or its equivalent on a driven element to be coupled to the driving element. The arms 29 of the spider 25 are hinged (shown diagrammatically at 30) respectively to the hubs 11 of three alternate rockers 10, and likewise the arms 31 of the spider 27 are hinged (shown diagrammatically at 32) respectively to the hubs of the other three alternate rockers 10.

The hinged connections between the rocker arms and the links and between the hubs of the rockers and the spiders are all torsionally-resistant resilient connections which provide torsional resilient resistance to hinging movement about the hinge axes from the normal position as shown in the drawing.

In the present example the torsionally-resistant resilient elements are rubber bushes.

Thus the hub 11 of each rocker has a bonded in rubber bush, 16 which receives the appropriate spider driving pin (not shown), and each arm of each rocker has a bore in which is bonded a rubber bush 17 which receives a connecting bolt 18 attaching the link 15 to the arm.

The bushes 16 may each have an inner metal sleeve to which the rubber is bonded, the spider driving pins being either keyed or force fitted into the inner sleeves. Alternatively the spider driving pins may be force fitted or bonded directly in the bushes 16.

The rocker arm ends are received in forks 35 at the ends of the links 15, the connecting bolts 18 passing through the ears 19, 20 of the link forks, and the bolts being bonded or force fitted in the bushes 17.

Figure 3:
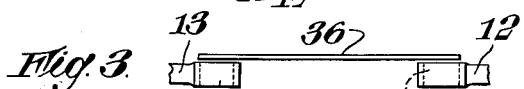
FIGS. 3 and 4 are views similar to FIG. 2 showing alternative constructions of links.

Alternatively instead of using solid links 15 with forked ends 35, each link may be replaced by a pair of parallel links 36 one on each side of the rocker arm ends 12, 13, the rocker arm ends being received between the links, and the connecting bolts passing through the links (see FIG. 3).

Figure 4:
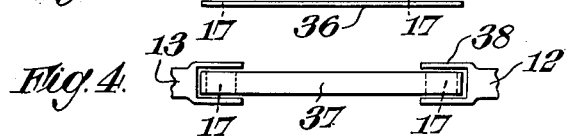

In a still further construction (FIG. 4) the bushes 17 may be bonded in bores in the ends of single, unformed link 37, and the ends of the rocker arms 12, 13 forked (at 38) to receive the ends of the link 37.

Each rocker 10 has in addition a pair of arm like extensions 21, 22 approximately opposite the arms 12, 13.

These arm-like extensions each terminate in a flat platform 24, and the platforms on alternate rockers carry rubber buffers 23, the adjacent platforms confronting each other.

Figure 5:
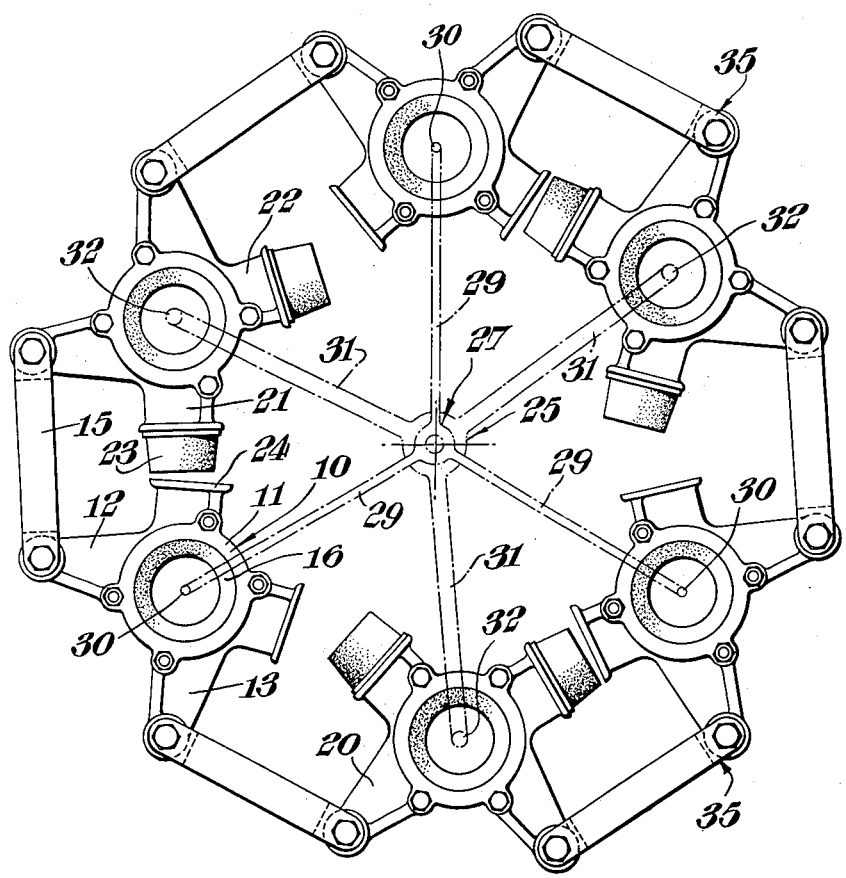
FIG. 5 is a view corresponding to FIG. 1 of the coupling shown in FIG. 1 but showing the coupling deflected.

With the coupling described, when torque is transmitted between the driving and driven spiders 25, 27 respectively a relative angular displacement occurs between the spiders as exemplified in FIG. 5, and the six rockers swing on their hinged connections with the spider driving pins so that depending on the direction of the relative angular displacement, one or other set of alternate pairs of buffered and un-buffered platforms 24 on adjacent rockers approach one another, and the other pairs of buffered and un-buffered platforms on adjacent rockers recede from one another.

The relative angular displacement is resisted by the torsion in the bushes 16 and 17, the bushes being subjected in addition to compression, and the torque is transmitted through the bushes 16 and 17 until such time as the torque rises sufficiently for the relative angular displacement of the spiders to be such as to bring the approaching buffered and un-buffered platforms into contact, whereafter the torque is transmitted through the bushes 16 and the engaging buffers.

It will be seen therefore that the coupling provides initially a low stiffness, when the buffers are not in contact, with a much higher value after a predetermined torque is reached. Thus the coupling may be designed with a marked non-linear stiffness characteristic with variations in torque.

Upon relative angular displacement of the driving and driven spiders the variation in geometry of the rocker-link ring which accommodates the angular displacement imposes a deflection on the bushes 17 radially of the coupling. It is important that the angle between the arms 12 and 13 of each rocker be chosen so that no excessive radial load is applied to the bushes 17, and to this end a minimum radial deflection of the bushes 17 for any given relative angular displacement between the driving and driven spiders is to be desired. To achieve this the angle between the arms 12 and 13 of the rockers should be chosen such that $$\frac{r}{l}$$

is approximately equal to $$\frac{\sin \gamma \times \tan \gamma}{\cos \alpha \times \cot \frac{\alpha}{2}}$$

where $l$ is the length of the rocker arms 12 and 13, $r$ is the radius of the pitch circle on which the rocker axes are disposed and $\alpha$ and $\gamma$ are the angles indicated in the drawing.

In the present example, which uses six rockers, $\alpha=60°$ and the above formula reduces to $$\frac{r}{l}=\frac{2}{3}\sin \gamma \tan \gamma$$

It is to be noted that all the rockers 10 and all the links 15 are the same, which eases replacement and manufacture.

Instead of two sets of three rockers, two sets of rockers or any even number of sets greater than three may be used.

The normal or neutral position of the rockers and links as shown in the drawing may correspond with no load on the coupling.

There is however the possibility of selecting the neutral position to correspond for example with the mean load on the coupling. In this case it might be arranged that the reverse drive characteristic does not differ substantially as between low and high reverse torque, the reverse drive buffers coming into operation immediately on torque reversal, or very soon thereafter.

The buffers 23 on the buffered rocker arms may be of different construction to give different forward and reverse drive stiffness characteristics. Also the buffers, or the forward or the reverse drive buffers, may incorporate features to give a gradual increase of stiffness with deflection once they are engaged. For example the buffers instead of being flat faced may be dome shaped.

The coupling as described is capable of accommodating angular misalignment by axial deflection of the rubber bushes. The coupling will therefore serve also as a universal joint.

I claim:

1. A flexible torque transmission coupling for drivably connecting a driving element with a driven element, comprising an articulated ring of rockers and links, there being at least two rockers for pivotal connection to the driving element at points spaced round a common pitch circle and arranged in circumferential alternation with a like number of similar rockers for pivotal connection to the driven element also at points spaced round said common pitch circle, each rocker being connected to the rocker on either side of it by a pair of the links which are hinged to the rockers by torsionally resistant resilient elements.

2. A flexible torque transmission coupling for drivably connecting a driving element with a driven element, comprising an articulated ring of rockers and links, there being at least two rockers for pivotal connection to the driving element at points spaced round a common pitch circle and arranged in circumferential alternation with a like number of similar rockers for pivotal connection to the driven element also at points spaced round said common pitch circle, each rocker having a pair of arms which project outwardly from said common pitch circle, the adjacent arms of adjacent rockers being interconnected by the links which are hinged to the rocker arms by torsionally resistant resilient elements.

3. A flexible torque transmission coupling as claimed in claim 2, in which the included angle between the rocker arms is such that, approximately $$\frac{r}{l}=\frac{\sin \gamma \times \tan \gamma}{\cos \alpha \times \cot \frac{\alpha}{2}}$$

where $l$=the length of the rocker arms
$r$=the radius of the pitch circle
$\alpha=360°$ divided by the number of rockers, and
$\gamma$=the angle included between each rocker arm and a line joining the pivot axis of its rocker with the pivot axis of the adjacent rocker on the side adjacent the arm.

4. A flexible torque transmission coupling for drivably connecting a driving element with a driven element, comprising an articulated ring of rockers and links, there being at least two rockers for pivotal connection to the driving element at points spaced round a common pitch circle and arranged in circumferential alternation with a like number of similar rockers for pivotal connection to the driven element also at points spaced round said common pitch circle, each rocker being connected to the rocker on either side of it by a pair of the links which are hinged to the rockers by torsionally resistant resilient elements and resilient buffer means carried by confronting portions of alternate pairs of adjacent rockers to make contact to transmit torque from the driving element to the driven element after a predetermined angular deflection of the coupling in one direction.

5. A flexible torque transmission coupling for drivably connecting a driving element with a driven element, comprising an articulated ring of rockers and links, there being at least two rockers for pivotal connection to the driving element at points spaced round a common pitch circle and arranged in circumferential alternation with a like number of similar rockers for pivotal connection to the driven element also at points spaced round said common pitch circle, each rocker being connected to the rocker on either side of it by a pair of the links which are hinged to the rockers by torsionally resistant resilient elements and resilient buffer means carried by confronting portions of each pair of adjacent rockers, one set of alternate buffer means to make contact to transmit torque from the driving element to the driven element after a predetermined angular deflection of the coupling in one direction and the other set of alternate buffer means to make contact to transmit torque from the driving element to the driven element after a predetermined angular deflection of the coupling in the other direction.

6. A flexible torque transmission coupling for drivably connecting a driving element with a driven element, comprising an articulated ring of rockers and links, there being at least two rockers for pivotal connection to the driving element at points spaced round a common pitch circle and arranged in circumferential alternation with a like number of similar rockers for pivotal connection to the driven element also at points spaced round said common pitch circle, each rocker having a first pair of arms which project outwardly from said common pitch circle and a second pair of arms which project inwardly from said common pitch circle, adjacent outwardly projecting arms of adjacent rockers being inter-connected by the links which are hinged to the arms by torsionally resistant resilient elements, and adjacent inwardly projecting arms of adjacent rockers having confronting platform parts one of which carries a resilient buffer which is normally spaced from the other platform part but which may be brought into engagement therewith by deflection of the coupling.

7. A flexible torque transmission coupling for drivably connecting a driving element with a driven element, comprising an articulated ring of rockers and links, there being at least two rockers having torsionally resistant resilient elements for pivotally connecting the rockers to the driving element at points spaced around a common pitch circle and arranged in circumferential alternation with a like number of similar rockers having torsionally resistant resilient elements for pivotally connecting the rockers to the driven element also at points spaced round said common pitch circle, each rocker being connected to the rocker on either side of it by a pair of the links which are hinged to the rockers by torsionally resistant resilient elements.

8. A flexible torque transmission coupling as claimed in claim 7, wherein the torsionally resistant resilient elements are rubber bushes.

9. A flexible torque transmission coupling as claimed in claim 8, wherein the rubber bushes are in radial compression.

References Cited in the file of this patent

UNITED STATES PATENTS

| | | |
|---|---|---|
| 557,162 | Sperry | Mar. 31, 1896 |
| 2,024,474 | Perry | Dec. 17, 1935 |
| 2,153,465 | Hardy | Apr. 4, 1939 |
| 2,791,893 | Hirst | May 14, 1957 |
| 2,942,440 | Smith | June 28, 1960 |